(12) United States Patent
Kroenke et al.

(10) Patent No.: US 12,490,944 B2
(45) Date of Patent: Dec. 9, 2025

(54) POSITIONING AN OBJECT WITH RESPECT TO AN X-RAY DETECTOR (71) Applicant: KONINKLIJKE PHILIPS N.V., Eindhoven (NL)

(72) Inventors: Sven Kroenke, Hamburg (DE); Martin Bergtholdt, Hamburg (DE); Daniel Bystrov, Hamburg (DE); Bernd Menser, Hauset (BE); Thomas Netsch, Hamburg (DE); Julien Thomas Senegas, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 182 days.

(21) Appl. No.: 18/568,386

(22) PCT Filed: Jun. 7, 2022

(86) PCT No.: PCT/EP2022/065340
§ 371 (c)(1),
(2) Date: Dec. 8, 2023

(87) PCT Pub. No.: WO2022/258583
PCT Pub. Date: Dec. 15, 2022

(65) Prior Publication Data
US 2024/0268781 A1 Aug. 15, 2024

(30) Foreign Application Priority Data
Jun. 11, 2021 (EP) ..................................... 21178958

(51) Int. Cl.
*A61B 6/08* (2006.01)
*A61B 6/58* (2024.01)

(52) U.S. Cl.
CPC ................. *A61B 6/08* (2013.01); *A61B 6/587* (2013.01); *A61B 6/588* (2013.01); *A61B 6/589* (2013.01)

(58) Field of Classification Search
CPC ........... A61B 6/08; A61B 6/587; A61B 6/588; A61B 6/589
See application file for complete search history.

(56) References Cited

U.S. PATENT DOCUMENTS

2015/0327821 A1* 11/2015 Hu ........................ A61B 6/544
378/62
2017/0007196 A1* 1/2017 Don ...................... A61B 6/461
(Continued)

FOREIGN PATENT DOCUMENTS

WO WO2015081295 A1 6/2015

OTHER PUBLICATIONS

PCT International Search Report, International application No. PCT/EP2022/065340, Sep. 22, 2022.

*Primary Examiner* — Chih-Cheng Kao
(74) *Attorney, Agent, or Firm* — Larry Liberchuk (57) ABSTRACT

An X-ray imaging system (100) includes an X-ray source (110), an X-ray detector (120), a depth camera (130), and a processor (140). The processor (140) receives depth camera image data from the depth camera, projects the depth camera image data onto a radiation-receiving surface of the X-ray detector (120), from a perspective of the X-ray source (110), and generates an image representation (170) of the projected depth camera image data on the radiation-receiving surface of the X-ray detector (120), from a perspective of the depth camera (130).

15 Claims, 7 Drawing Sheets

(56) References Cited

U.S. PATENT DOCUMENTS

2017/0135668 A1    5/2017   Merckx
2018/0338742 A1   11/2018   Singh
2020/0100757 A1    4/2020   Senegas
2021/0150704 A1    5/2021   Bruening

* cited by examiner

POSITIONING AN OBJECT WITH RESPECT TO AN X-RAY DETECTOR

FIELD OF THE INVENTION

The present disclosure relates to positioning an object with respect to an X-ray detector. An X-ray imaging system, a computer-implemented method, and a computer program product, are also disclosed.

BACKGROUND OF THE INVENTION

X-ray imaging systems include an X-ray source and an X-ray detector. The X-ray source and the X-ray detector are separated by an examination region. An object may be disposed in the examination region in order to perform an X-ray imaging operation on the object. In order to avoid the need for repeat X-ray images and the associated increase in X-ray dose, it is important that the object to be imaged is correctly positioned with respect to the X-ray detector.

More specifically, X-ray detectors include radiation-sensitive regions that are used for generating X-ray image data, and it is important that the object is correctly positioned with respect to these radiation-sensitive regions in order to generate an X-ray image of the object.

Some X-ray detectors also include radiation dose-measurement regions that are used to generate dose data during generation of the X-ray image data. The dose data is sometimes used to automatically control a duration of the emission of X-ray radiation, and thereby provide a desired signal-to-noise ratio in the resulting X-ray image. This operation is sometimes referred to as automatic exposure control "AEC". The correct positioning of the patient with respect to these radiation dose-measurement regions is also important, particularly when performing an X-ray imaging procedure on an object that includes density variations.

By way of an example, when performing a lateral thorax imaging operation, it is important to firstly position a patient's thorax such that it overlaps the radiation sensitive regions of the X-ray detector, and to secondly position the X-ray detector's radiation dose-measurement region on the posterior side of the spine with little or no overlap with the spine. If the spine obscures the radiation dose measurement region, X-ray attenuation by the high density spine suppresses the measured dose data. If the dose data is used to automatically control the duration of the emission of X-ray radiation via automatic exposure control, the resulting prolongation of this duration can degrade the contrast in the X-ray image, rendering it inaccurate for diagnostic purposes.

The positioning of objects with respect to X-ray detectors is conventionally performed either by eye, or via a monitor that displays a visible, or red-green-blue "RGB" camera image of the object. Depth images that are generated by depth cameras may likewise be displayed on a monitor and used to position objects with respect to X-ray detectors in a similar manner. The extent of an X-ray detector's radiation-sensitive region and its radiation dose-measurement region is typically marked on the radiation-receiving surface of the detector. In-use, an operator positions the object with respect to the detector by eye, or via the monitor using the markings on the detector's surface.

However, conventional approaches for positioning objects with respect to X-ray detectors have drawbacks. In order to avoid obscuring the path between the X-ray source and the X-ray detector, the camera, and similarly the human eye, typically views the examination region between the X-ray source and X-ray detector from a position that is offset with respect to the X-ray source. With the depth camera in such an offset position, it is difficult for the operator to ascertain whether X-ray radiation emitted by the X-ray source will create a desired projection image of the object on the X-ray detector, particularly when the offset is large. Moreover, the object can obscure the markings on the radiation-receiving surface of the detector. Such issues can result in the object being sub-optimally positioned with respect to the detector, and the need to re-take the X-ray image. This hampers workflow, and increases the radiation dose to the object.

Consequently, there is a need to improve the way in which objects are positioned with respect to an X-ray detector.

SUMMARY OF THE INVENTION

According to one aspect of the present disclosure, an X-ray imaging system is provided. The X-ray imaging system includes an X-ray source, an X-ray detector, a depth camera, and a processor. The X-ray source and the X-ray detector are separated by an examination region for performing an X-ray imaging operation on an object when the object is received within the examination region. The depth camera is configured to view the examination region for generating depth camera image data representing the object when the object is received within the examination region. The processor is configured to:

receive the depth camera image data;
project the depth camera image data onto a radiation-receiving surface of the X-ray detector, from a perspective of the X-ray source; and to
generate an image representation of the projected depth camera image data on the radiation-receiving surface of the X-ray detector, from a perspective of the depth camera.

Further aspects, features, and advantages of the present disclosure will become apparent from the following description of examples, which is made with reference to the accompanying drawings.

DETAILED DESCRIPTION OF EMBODIMENTS

Examples of the present disclosure are provided with reference to the following description and figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to an X-ray imaging system, may be implemented in a computer implemented method, and in a computer program product, in a corresponding manner.

In the following description, reference is made to an X-ray imaging system. The X-ray imaging system may for example be the DigitalDiagnost C90 marketed by Philips Healthcare, Best, the Netherlands, or another type of X-ray imaging system. In some example arrangements, the X-ray source of the X-ray imaging system is mounted to a ceiling via a gantry, and the corresponding X-ray detector is mounted to a stand and held in the vertical position. However, examples of the present disclosure are not limited to this particular arrangement, and it is to be appreciated that the X-ray source and X-ray detector may alternatively be mounted in a different manner, and also held in different positions.

In the following description, reference is made to various methods that are implemented by a processor, i.e. a computer. It is noted that the computer-implemented methods disclosed herein may be provided as a non-transitory computer-readable storage medium including computer-readable instructions stored thereon, which, when executed by at least one processor, cause the at least one processor to perform the method. In other words, the computer-implemented methods may be implemented in a computer program product. The computer program product can be provided by dedicated hardware, or hardware capable of running the software in association with appropriate software. When provided by a processor, the functions of the method features can be provided by a single dedicated processor, or by a single shared processor, or by a plurality of individual processors, some of which can be shared. The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer-usable storage medium, or a computer-readable storage medium, the computer program product providing program code for use by or in connection with a computer or any instruction execution system. For the purposes of this description, a computer-usable storage medium or a computer readable storage medium can be any apparatus that can comprise, store, communicate, propagate, or transport a program for use by or in connection with an instruction execution system, apparatus, or device. The medium can be an electronic, magnetic, optical, electromagnetic, infrared, or a semiconductor system or device or propagation medium. Examples of computer-readable media include semiconductor or solid state memories, magnetic tape, removable computer disks, random access memory "RAM", read-only memory "ROM", rigid magnetic disks and optical disks. Current examples of optical disks include compact disk-read only memory "CD-ROM", compact disk-read/write "CD-R/W". Blu-Ray™ and DVD.

As mentioned above, in order to avoid the need for repeat X-ray images and the associated increase in X-ray dose, it is important that an object to be imaged is correctly positioned with respect to an X-ray detector.

Figure 1:
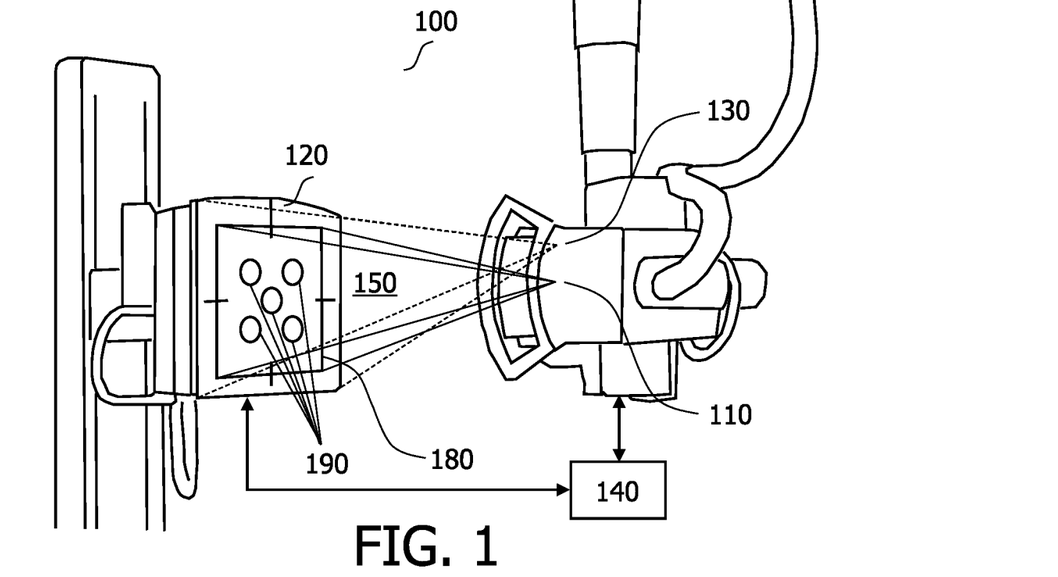
FIG. 1 is a schematic diagram illustrating a first perspective of an example X-ray imaging system 100 including an X-ray source and an X-ray detector 120, in accordance with some aspects of the present disclosure.

FIG. 1 is a schematic diagram illustrating a first perspective of an example X-ray imaging system 100 including an X-ray source and an X-ray detector 120, in accordance with some aspects of the present disclosure. The X-ray imaging system 100 also includes a depth camera 130, and a processor 140. The X-ray source 110 and the X-ray detector 120 are separated by an examination region 150 for performing an X-ray imaging operation on an object 160 when the object is received within the examination region. The X-ray source and X-ray detector are typically maintained in a static position during the imaging operation. The object may for example be a portion of the human body, or indeed any object. In the illustrated example, the X-ray source is mounted to the ceiling via a gantry, and the X-ray detector is mounted to a stand and held in the vertical position. Alternative arrangements, mounting arrangements, and positions of the X-ray source 110 and the X-ray detector 120 may also be used.

Figure 2:
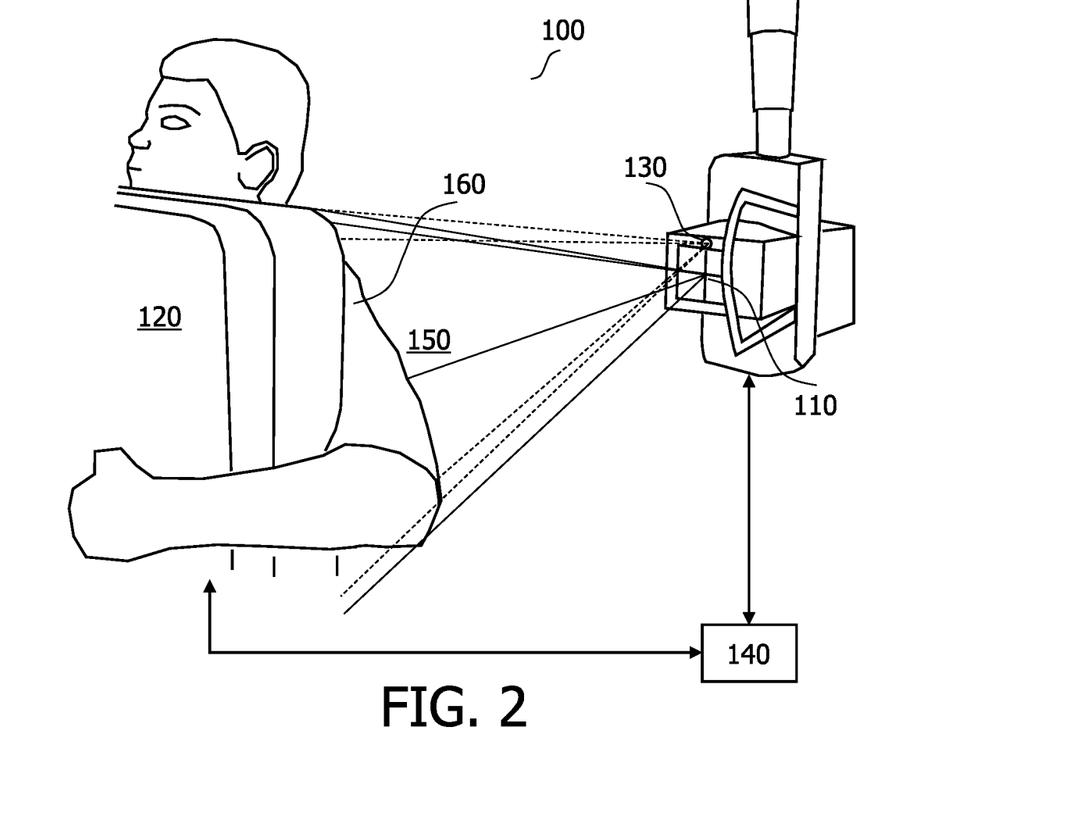
FIG. 2 is a schematic diagram illustrating a second perspective of an example X-ray imaging system 100 including an X-ray source and an X-ray detector 120, in accordance with some aspects of the present disclosure.

FIG. 2 is a schematic diagram illustrating a second perspective of an example X-ray imaging system 100 including an X-ray source and an X-ray detector 120, in accordance with some aspects of the present disclosure. As compared to FIG. 1, the perspective of FIG. 2 more clearly illustrates the position of the X-ray source 110 and the depth camera 130. Also, in FIG. 2, an example object 160 in the form of a patient, is received within the examination region 150 in order to perform an X-ray imaging operation, in the illustrated case, a chest X-ray imaging operation, on the patient. The solid lines extending between the X-ray source 110 and the X-ray detector 120 in FIG. 1 and FIG. 2 indicate the volumetric extent of the overlap between the X-ray beam emitted by the X-ray source 110, and the X-ray radiation-sensitive region of the X-ray detector 120, and within which the X-ray image data may be generated. The volumetric extent of this overlap defines the examination region 150. A perimeter of the X-ray radiation-sensitive region 180 of the X-ray detector may be marked on the radiation-receiving surface of the X-ray detector, as illustrated by the rectangular outline on the X-ray detector in FIG. 1. In some examples, the X-ray detector 120 also includes one or more radiation dose-measurement regions 190 for generating X-ray dose measurement data. These are sometimes referred-to as automatic exposure control "AEC" chambers. In the illustrated example in FIG. 1, there are five circular radiation dose-measurement regions, although in other examples these may have a different shape, and there may be a different number of radiation dose-measurement regions, or even none at all.

In-use, it is desirable that the object 160 is correctly positioned with respect to the X-ray detector 120, or more specifically with respect to the X-ray radiation-sensitive region 180 and/or the one or more radiation dose-measurement regions 190, in order to obtain reliable X-ray images of the object 160.

The depth camera 130 illustrated in FIG. 1 and FIG. 2 is configured to view the examination region 150 in order to generate depth camera image data representing the object 160 when the object is received within the examination region 150. In other words, the depth camera 130 has a field of view, which overlaps with a portion of the examination region 150. In general, the depth camera image data generated by a depth camera represents the range between the depth camera and points on the surfaces of objects within the depth camera's field of view. With reference to FIG. 1 and FIG. 2, the depth camera image data may therefore represent a three-dimensional shape of a surface of the object 160. In the example arrangement illustrated in FIG. 1 and FIG. 2, the minimum extent of the field of view of the depth camera is indicated by the dashed lines extending between the depth camera 130 and the X-ray detector 120.

The depth camera 130 in the example arrangement illustrated in FIG. 1 and FIG. 2 is mechanically coupled to the X-ray source 110. However the depth camera 130 may alternatively be positioned elsewhere in order to view the examination region 150. The depth camera may for example be mechanically coupled to a wall, or to a ceiling of a room in which the X-ray imaging system 100 is located, or it may be mechanically coupled to a floor-based stand in the room. The depth camera may alternatively be mobile. In some examples, the depth camera may therefore be capable of being moved around a room in which the X-ray imaging system 100 is located. In each of these alternative arrangements, the depth camera is able to view the examination region 150.

The use of various types of depth camera is contemplated for depth camera 130. The camera may for example employ a time-of-flight, or LIDAR principle, or a structured light principle, or a binocular stereo vision principle. In the time-of-flight, or LIDAR principle, the time taken for emitted light pulses to travel from the position of the camera to objects in a scene and back again, is used to generate depth camera image data representing the range to the objects. The Azure Kinect DK depth camera, and the Intel RealSense™ LiDAR Camera L515 are examples of depth cameras that employ this principle. In the structured light principle, an optical pattern is projected onto the surface of objects within a scene, and the disparity between the original projected pattern, and the pattern that is deformed by the surface of the objects is imaged by one or more cameras. In the binocular stereo vision principle, different views of a scene are used to compute a depth map of the scene.

In some examples, the depth camera 130 also generates optical image data representing the object 160 when the object is received within the examination region 150. This optical image data may be provided by the aforementioned cameras in addition to the depth camera image data that they provide. Such cameras may be referred-to as RGB-D cameras. The optical image data may represent a visible or infrared portion of the optical spectrum.

The processor 140 illustrated in FIG. 1 is configured to receive the depth camera image data. The processor may receive the depth camera image data via any form of digital communication. The processor 140 may receive the depth camera image data from the depth camera 130. The communication path may be direct, or indirect. The processor 140 and the depth camera 130 may for example include a direct wired or wireless communication path, such as an electrical cable or ethernet, or a wireless infrared or RF communication path such as Bluetooth, as illustrated by the arrows connecting these items in FIG. 1 and FIG. 2. Alternatively, the communication path may be indirect, and the processor 140 and the depth camera 130 may be in communication with one another via the internet, the cloud, or a computer readable storage memory.

Moreover, the processor 140 is configured to:
project the depth camera image data onto a radiation-receiving surface of the X-ray detector 120, from a perspective of the X-ray source 110; and to
generate an image representation 170 of the projected depth camera image data on the radiation-receiving surface of the X-ray detector 120, from a perspective of the depth camera 130.

In so doing, an image representation 170 is provided that obviates one or more challenges involved in positioning the object with respect to the X-ray source. These are described with reference to FIG. 3 and FIG. 4.

Figure 3:
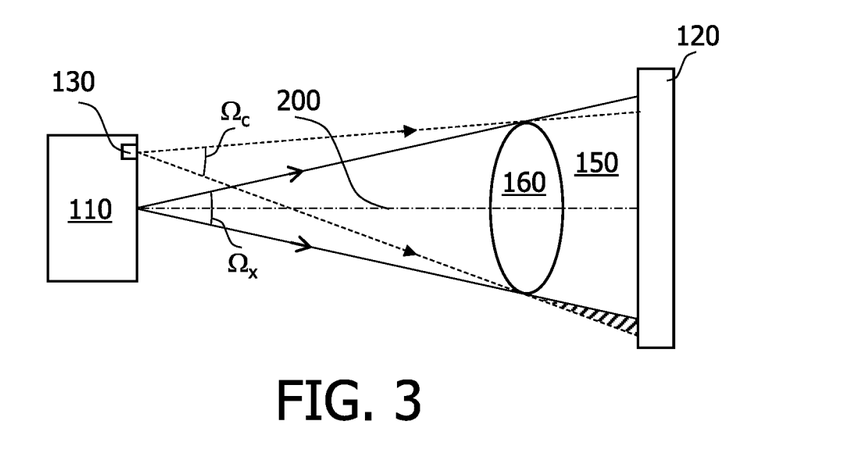
FIG. 3 is a schematic diagram illustrating a comparative example of an arrangement including an X-ray source, an X-ray detector 120 and a depth camera 130.

FIG. 3 is a schematic diagram illustrating a comparative example of an arrangement including an X-ray source, an X-ray detector 120 and a depth camera 130. In FIG. 3, the X-ray source and the X-ray detector are separated by an examination region 150. The X-ray source and the X-ray detector may be used to perform an X-ray imaging operation on an object 160 that is disposed in the examination region 150. The X-ray source 110 generates X-ray radiation within a volumetric beam defined by solid angle $\Omega_x$, and which is detected by X-ray detector 120 in order to generate X-ray image data. A depth camera 130, or alternatively an optical camera, is located at an offset position with respect to an axis 200 passing through the X-ray source 110 and a centre of the X-ray detector. The depth camera 130 is arranged so as to view the examination region 150, and also the object 160. Depth camera images, or indeed optical camera images, that are generated from this offset position provide some assistance to an operator in positioning the object 160 with respect to the detector 120 in order to generate X-ray images of the object 160. However, with the depth camera in this offset position, it is difficult for the operator to ascertain whether X-ray radiation emitted by the X-ray source will create a desired projection image of the object 160 on the X-ray detector 120, particularly when the offset is large. The FIG. 3 arrangement may therefore lead to the object 160 being mis-positioned with respect to the X-ray detector, and the need to re-take the X-ray image with the object 160 in a better position.

In order to address this issue, in one prior art approach it has been proposed to transform the depth camera image data, and to view the depth camera image data from the perspective of the X-ray source. This approach, however, results in a view of the object 160 that is unintuitive. Moreover, it suffers from the draw back of missing depth camera image data in occluded regions of the detector's surface. With reference to the arrangement illustrated in FIG. 3, the solid angle $\Omega_c$ and the dashed lines extending from the depth camera 130 define the extent of the boundary of the object 160 on the X-ray detector's surface, as seen from the perspective of the depth camera. The solid lines extending from the X-ray source indicate the extent of the boundary of the object 160 on the surface of the detector 120 when viewed from the perspective of the X-ray source 110. When viewed from this perspective, depth camera image data is missing from the hatched occluded region in FIG. 3. In order to compensate for the missing depth camera image data in the occluded region, the occluded region may be in-painted with data that is obtained in the absence of the object 160. This adds further complexity to approaches that involve viewing the depth camera image data from the perspective of the X-ray source.

Figure 4:
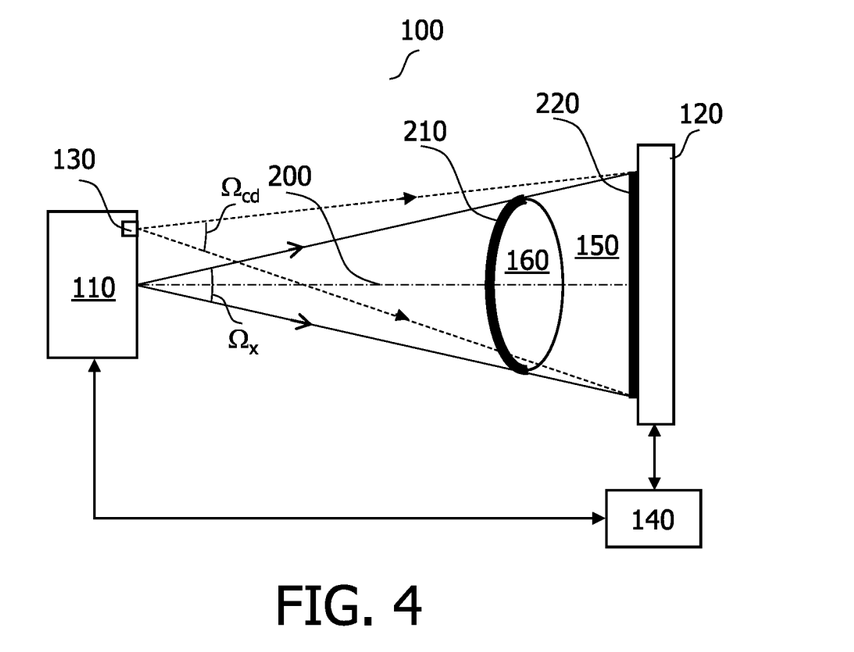
FIG. 4 is a schematic diagram illustrating an example arrangement including an X-ray source, an X-ray detector 120, a depth camera 130 and a processor 140, in accordance with some aspects of the present disclosure.

FIG. 4 is a schematic diagram illustrating an example arrangement including an X-ray source, an X-ray detector 120, a depth camera 130, and a processor 140, in accordance with some aspects of the present disclosure. As in the comparative example of FIG. 3, in FIG. 4, a depth camera 130 is positioned in order to view the examination region 150. In contrast to the comparative example described with reference to FIG. 3, in the approach of the present disclosure, the depth camera image data is projected onto a radiation-receiving surface of the X-ray detector 120, from a perspective of the X-ray source 110. An image representation 170 is then generated of the projected depth camera image data on the radiation-receiving surface of the X-ray detector 120, from a perspective of the depth camera 130. The projection is performed in a mathematical sense, based on the relative positions of the X-ray source 110, the X-ray detector 120, and the depth camera 130. With reference to FIG. 4, this is illustrated by way of the portion of the surface 210 of the object 160 and which is viewed by the depth camera 130, being projected onto the radiation-receiving surface of the X-ray detector 120 in order to provide projected image data 220. An image representation is subsequently generated of this projected image data 220, from the perspective of the depth camera 130. This image representation is more intuitive than a view of the depth camera image data from the perspective of the X-ray source. Consequently, the use of this image representation reduces the opportunity for the object 160 to be mis-positioned with respect to the X-ray detector 120, alleviating the need to re-take the X-ray image. Moreover, because the image representation is provided from the perspective of the depth camera, there is no need for in-painting because this is the same perspective as that from which the depth camera image data was acquired.

The projection of the depth camera image data onto the radiation-receiving surface of the X-ray detector 120, and the generation of the image representation 170 of the projected depth camera image data, may in general be performed based on a predetermined spatial relationship between the X-ray source 110, the X-ray detector 120, and the depth camera 130. The predetermined spatial relationship may be used to compute a spatial transformation that is applied to the relevant data to perform the projection.

The predetermined spatial relationship between the X-ray source 110, the X-ray detector 120, and the depth camera 130 may be determined in different ways.

In some examples, the positions of one or more of the X-ray source 110, the X-ray detector 120, and the depth camera 130 are fixed positions, and the predetermined spatial relationship is determined using calibration data that represents the fixed position(s). In some examples, the positions of all three of the X-ray source 110, the X-ray detector 120, and the depth camera 130 are fixed. In these examples, the predetermined spatial relationship between the X-ray source 110, the X-ray detector 120, and the depth camera 130, may be determined based on calibration data representing the relative positions of the X-ray source 110, the X-ray detector 120, and the depth camera 130.

The positions of the X-ray source 110. X-ray detector 120, and depth camera 130, may be fixed by for example mechanically attaching the relevant item to a reference position, such as the wall, the ceiling, the floor, and so forth. In some examples, it is contemplated to permit one or more of these items to be positioned in one of multiple selectable fixed positions, and to provide calibration data representing each of the fixed positions. For example, the X-ray source 110 and/or X-ray detector 120 may be moved into one of multiple selectable fixed positions. Calibration data representing the positions or the relative positions may be stored in a database, for example as a lookup table, and accessed by the processor in order to compute the aforementioned spatial transformation.

In some examples, the positions of one or more of the X-ray source 110, the X-ray detector 120, and the depth camera may be movable to any position, and the predetermined spatial relationship between the X-ray source 110, the X-ray detector 120, and the depth camera 130, is determined using a position sensor. Various types of position sensors are contemplated in this respect, including position sensors that employ optical, radiofrequency "RF", or ultrasound tracking techniques. Examples of suitable position sensors include laser-based optical rangefinders. RF and ultrasound ranging transponders, and optical cameras that are configured to track the positions of fiducial markers disposed on one or more of the X-ray source 110, the X-ray detector 120, and the depth camera 130. In one example, a further depth camera is used to track the positions of one or more of the X-ray source 110, the X-ray detector 120, and the depth camera 130.

In one example, a spatial relationship between the depth camera 130 and the X-ray detector 120 is determined from depth camera image data that is generated by the depth camera 130. In this example, the depth camera 130 is further configured to view at least a portion of the radiation-receiving surface of the X-ray detector 120, and the depth camera 130 is further configured to generate depth camera image data representing the at least a portion of the radiation receiving surface of the X-ray detector 120. The processor 140 is further configured to determine a spatial relationship between the depth camera 130 and the X-ray detector 120 from the generated depth camera image data representing the at least a portion of the radiation receiving surface of the X-ray detector 120, and to determine the spatial relationship between the X-ray source 110, the X-ray detector 120, and the depth camera 130, using the determined spatial relationship between the depth camera 130 and the X-ray detector 120.

In this example, the depth camera 130 may view the portion of the surface of the X-ray detector 120 whilst the object 160 is received within the examination region 150, or in the absence of the object 160. In the latter case, the spatial relationship between the between the depth camera 130 and the X-ray detector 120 may be determined before the object is received within the examination region 150. For example, the spatial relationship may be determined immediately prior to the object being received within the examination region 150, or once per hour, once per day, or at a different time interval. As in the example above, calibration data representing the determined spatial relationship may be stored in a database, for example as a lookup table, and accessed by the processor 140 in order to compute the aforementioned spatial transformation.

Continuing with this example, the spatial relationship between the X-ray source 110, the X-ray detector 120, and the depth camera 130, may be determined using the spatial relationship between the depth camera 130 and the X-ray detector 120 that is determined from the generated depth camera image data, and based further on calibration data representing the relative positions of the X-ray source 110 and the depth camera 130 and/or the relative positions of the X-ray source 110 and the X-ray detector 120. By using this calibration data in combination with the spatial relationship between the depth camera 130 and the X-ray detector 120 that is determined from the generated depth camera image data, the relative positions of all three of the X-ray source 110, the X-ray detector 120, and the depth camera 130, may be determined. The calibration data may be stored in a database and accessed by the processor 140 in order to determine the aforementioned spatial transformation.

Continuing with this example, in FIG. 4, the depth camera 130 may be mechanically coupled to the X-ray source 110, and the calibration data may represent the relative positions of the X-ray source 110 and the depth camera 130. The depth camera 130 may alternatively be mechanically coupled to the X-ray source 110 and be movable into one of multiple selectable fixed positions. In this example, the calibration data may represent the multiple relative positions. Calibration data representing fixed relative positions of the X-ray source 110 and the X-ray detector 120 may be stored and used in a similar manner in combination with the spatial relationship between the depth camera 130 and the X-ray detector 120 that is determined from the generated depth camera image data, in order to determine the relative positions of all three of the X-ray source 110, the X-ray detector 120, and the depth camera 130.

FIG. 5-FIG. 9 illustrate various example image representations in accordance with the present disclosure. In general, it is noted that an image representation may be provided as a two-dimensional image, or a three-dimensional image.

Figure 5:
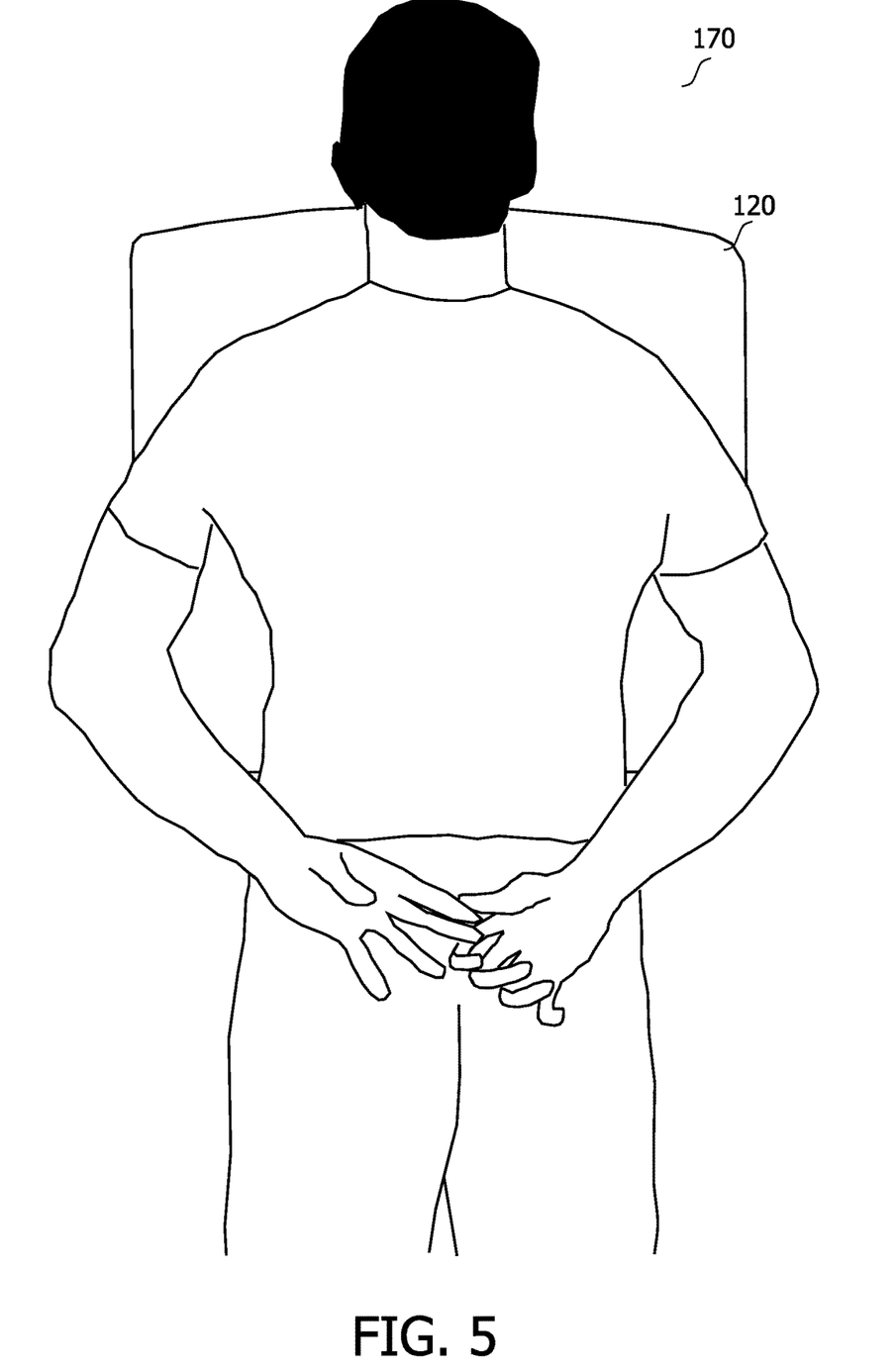
FIG. 5 is a schematic diagram illustrating a first example of an image representation 170 of projected depth camera image data on the radiation-receiving surface of an X-ray detector 120, from a perspective of the depth camera 130, in accordance with some aspects of the present disclosure.

FIG. 5 is a schematic diagram illustrating a first example of an image representation 170 of projected depth camera image data on the radiation-receiving surface of an X-ray detector 120, from a perspective of the depth camera 130, in accordance with some aspects of the present disclosure. In FIG. 5, the image representation 170 includes projected depth camera image data corresponding to the surface of the patient, as well as part of the radiation-receiving surface of the X-ray detector 120. The FIG. 5 image representation permits an operator to position the patient with respect to the outer perimeter of the X-ray detector.

In some examples, the X-ray detector 120 includes one or more radiation-sensitive regions 180 for generating X-ray image data and/or one or more radiation dose-measurement regions 190 for generating X-ray dose measurement data. In one example, the processor 140 is configured to generate an overlay image representation including the one or more X-ray radiation-sensitive regions 180 and/or a representation of the one or more X-ray radiation dose-measurement regions 190, and the image representation 170 of the projected depth camera image data. This is illustrated in FIG. 6, which is a schematic diagram illustrating a second example of an image representation 170 of projected depth camera image data on the radiation-receiving surface of an X-ray detector 120, from a perspective of the depth camera 130, in accordance with some aspects of the present disclosure.

Figure 6:
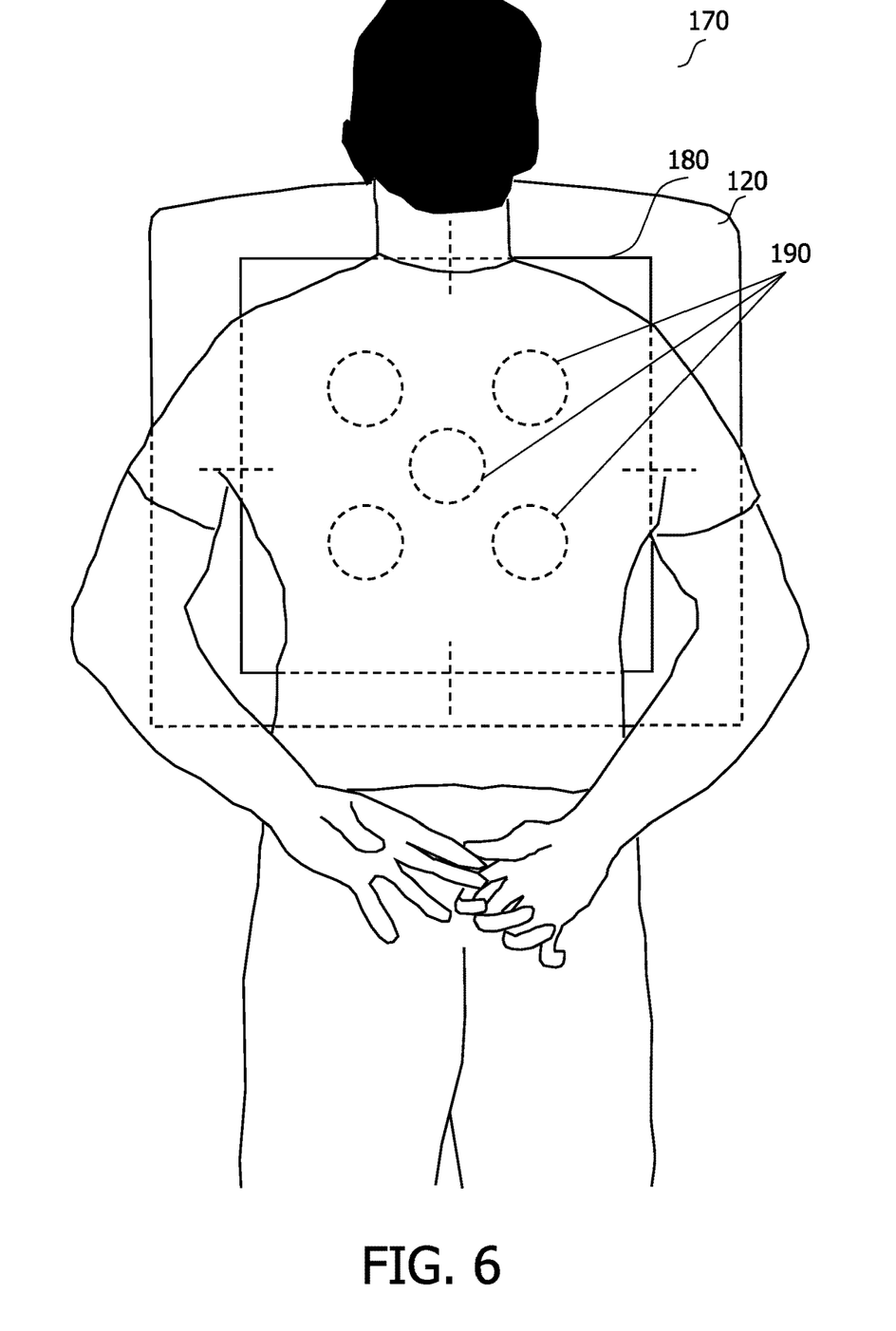
FIG. 6 is a schematic diagram illustrating a second example of an image representation 170 of projected depth camera image data on the radiation-receiving surface of an X-ray detector 120, from a perspective of the depth camera 130, in accordance with some aspects of the present disclosure.

As compared to FIG. 5, in FIG. 6, the projected depth camera image data is overlaid on top of the example five X-ray radiation dose-measurement regions 190 and the radiation-sensitive region 180. In FIG. 6, the patient is displayed in semi-transparent form. The X-ray detector 120 appears in the background, and the projected object 160, i.e. the patient, is provided as a semi-transparent overlay on top of the background. Alternatively, the projected object 160, i.e. the patient, may appear in the background, and the X-ray radiation-sensitive region(s) 180 and/or X-ray radiation dose-measurement region(s) 190, may be overlaid on top of the patient. The FIG. 6 image representation permits an operator to position the patient with respect to the X-ray radiation-sensitive regions 180, and with respect to the example five X-ray radiation dose-measurement regions 190.

With reference to the FIG. 6 example, the overlaying of the X-ray radiation-sensitive region(s) 180 and/or the X-ray radiation dose-measurement region(s) 190, and the projected depth camera image data, may be performed by i) detecting the radiation-receiving surface of the X-ray detector in the projected depth camera image data, and ii) mapping the positions of the X-ray radiation-sensitive region(s) 180 and/or the X-ray radiation dose-measurement region(s) 190 onto the detected radiation-receiving surface of the X-ray detector based on a knowledge of their positions respective the radiation-receiving surface of the X-ray detector 120. The positions of the X-ray radiation-sensitive region(s) 180 and/or the X-ray radiation dose-measurement region(s) 190 respective the radiation-receiving surface of the X-ray detector 120, may be determined by generating a reference depth camera image that includes the radiation-receiving surface of the X-ray detector 120 in the absence of the object 160, i.e. the illustrated patient, and determining the positions of the X-ray radiation-sensitive region(s) 180 and the X-ray radiation dose-measurement region(s) 190 respective the reference depth camera image from a corresponding RGB image. Alternatively, the position of the X-ray radiation-sensitive region(s) 180 and the X-ray radiation dose-measurement region(s) 190 respective the radiation-receiving surface of the X-ray detector 120 may be known from calibration data representing a geometric model of their positions.

Figure 7:
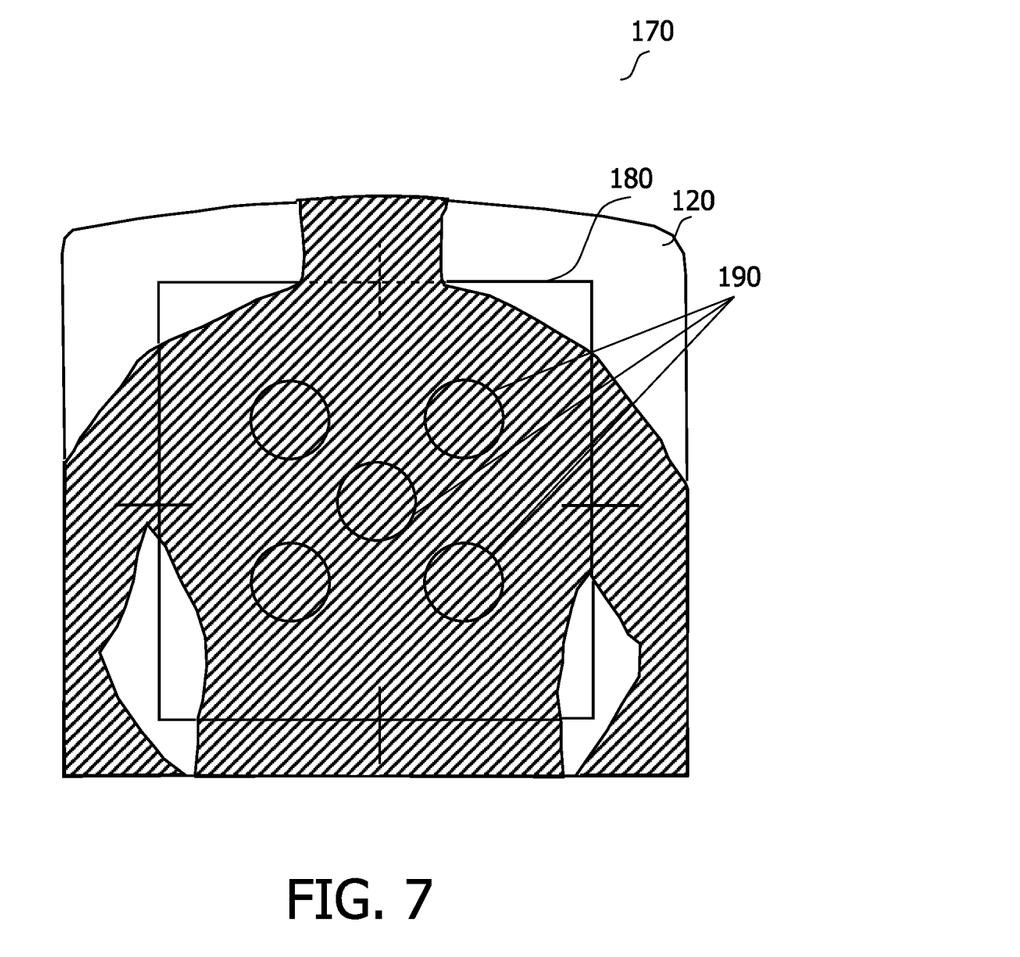
FIG. 7 is a schematic diagram illustrating a third example of an image representation 170 of projected depth camera image data on the radiation-receiving surface of an X-ray detector 120, from a perspective of the depth camera 130, in accordance with some aspects of the present disclosure.

FIG. 7 is a schematic diagram illustrating a third example of an image representation 170 of projected depth camera image data on the radiation-receiving surface of an X-ray detector 120, from a perspective of the depth camera 130, in accordance with some aspects of the present disclosure. As compared to FIG. 6, in the FIG. 7 image representation 170, the surface of the patient is replaced by its silhouette on the surface of the X-ray detector 120.

Figure 8:
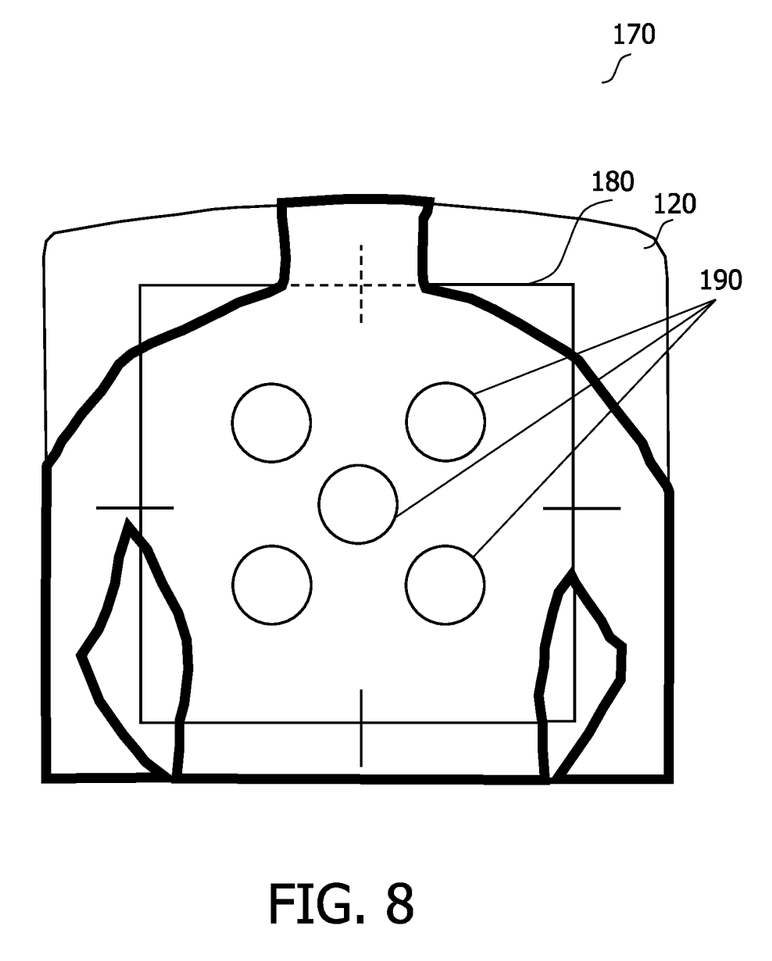
FIG. 8 is a schematic diagram illustrating a fourth example of an image representation 170 of projected depth camera image data on the radiation-receiving surface of an X-ray detector 120, from a perspective of the depth camera 130, in accordance with some aspects of the present disclosure.

FIG. 8 is a schematic diagram illustrating a fourth example of an image representation 170 of projected depth camera image data on the radiation-receiving surface of an X-ray detector 120, from a perspective of the depth camera 130, in accordance with some aspects of the present disclosure. As compared to FIG. 6, in the FIG. 8 image representation 170, the surface of the patient is replaced by its outline where it overlaps the surface of the X-ray detector.

Figure 9:
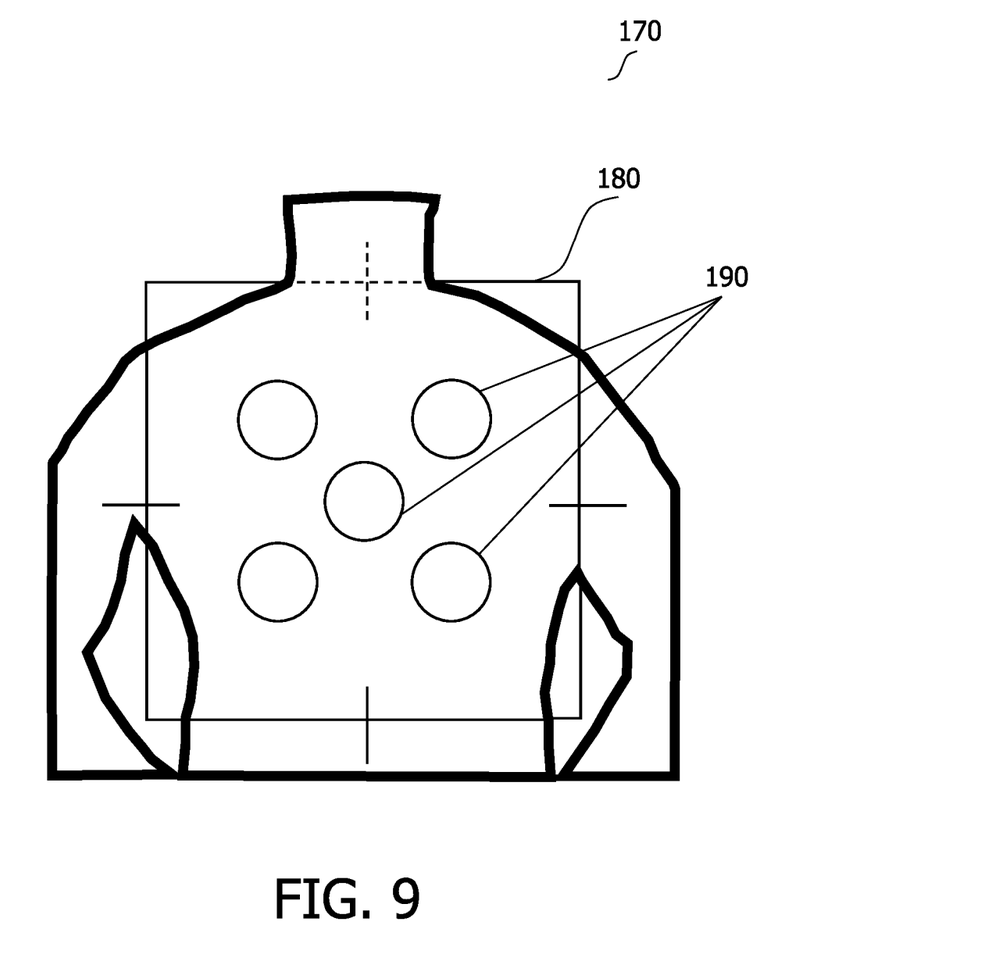
FIG. 9 is a schematic diagram illustrating a fifth example of an image representation 170 of projected depth camera image data on the radiation-receiving surface of an X-ray detector 120, from a perspective of the depth camera 130, in accordance with some aspects of the present disclosure.

FIG. 9 is a schematic diagram illustrating a fifth example of an image representation 170 of projected depth camera image data on the radiation-receiving surface of an X-ray detector 120, from a perspective of the depth camera 130, in accordance with some aspects of the present disclosure. As compared to FIG. 8, in the FIG. 9 image representation 170, provides a schematic visualisation of the position of the object 160 respective the X-ray radiation-sensitive region 180 and the X-ray radiation dose-measurement regions 190. In the schematic visualisation, the object is identified in the depth camera image data and substituted with a schematic illustration of the object.

In one example, one or more corrective actions for obtaining a more-optimal position of the patient with respect to the X-ray detector 120 are also generated. In this example, the processor 140 is further configured to compute a displacement between a position of one or more features in the image representation 170 of the projected depth camera image data, and an expected position of the one or more features respective i) the representation of the one or more X-ray radiation-sensitive regions 180 and/or ii) the representation of the one or more X-ray radiation dose-measurement regions 190. The processor 140 is further configured to generate, based on the computed displacement, an output representing one or more corrective actions for reducing the displacement.

In this example, image processing techniques may be used identify features such as a silhouette of the patient on the surface of the X-ray detector, or the position of a limb, or the head, and so forth, from the depth camera image data. The expected position of the feature may be determined based on user input of the type of imaging operation taking place, based on the automatic detection of a current position of an anatomical landmark or region of the patient, based on a classification of the view of the patient, or a combination of these factors. For example, if a chest imaging operation is taking place, the silhouette of the patient's torso on the surface of the detector may be identified, and the corrective actions may include "move torso to the right by 5 centimetres" in order to align the patient's torso with the X-ray radiation-sensitive region 180. The corrective actions may be outputted in the form of audio instructions, or displayed on a monitor. For example, directional arrows accompanied by a distance by which the object should be moved may be overlaid on the relevant portion of the image representation 170.

In one example, the depth camera 130 also generates optical image data. In this example, the processor 140 generates the image representation 170 of the projected depth camera image data, such that the image representation includes the optical image data. An RGB-D camera may for example be used to provide the optical image data in addition to the depth camera image data. The optical image data may be in the visible or infrared portion of the electromagnetic spectrum. The optical image data may be included in the image representation 170 by generating an overlay of the optical image data and the representation of the projected depth camera image data. The overlay may further assist a user in positioning the patient with respect to the X-ray detector 120.

Returning to FIG. 4. In most situations, the portion of the surface 210 of the object 160 that is "visible" from the perspective of the X-ray source 110, and which is projected onto the surface of the X-ray detector 120, can be determined to a very good approximation from the depth camera image data, despite its offset position. However, if the offset is large, the projected surface of the object may be incomplete on the opposite side of the X-ray source to the offset, i.e. at the lower portion of the projected image data 220 in FIG. 4. In such situations, a more complete projection of the depth camera image data onto the radiation-receiving surface of the X-ray detector 120, from a perspective of the X-ray source 110, can be obtained by combining the projection data that is obtained from different rotational positions of the depth camera with respect to the X-ray source 110. Thus, in one example, the depth camera is mechanically coupled to the X-ray source 110, and the depth camera 130 is offset in a radial direction with respect to an axis 200 passing through the X-ray source 110 and a centre of the X-ray detector 120, or the depth camera 130 is offset in a radial direction with respect to an axis passing through a centre of a radiation beam emitted by the X-ray source 110. The depth camera 130 is rotatable about said axis 200 for generating the depth camera image data from different rotational positions with respect to the axis.

In this example, both the depth camera 130 and the X-ray source may be rotatable about the axis together: i.e. there is no relative movement between the X-ray source and the X-ray detector during the rotation, or the depth camera 130 may be independently rotatable with respect to the X-ray source; and in which case the X-ray detector remains static whilst the depth camera is rotated. In this example, the depth camera may be freely rotated to any angular position, or indeed the depth camera may be rotated to one of multiple selectable fixed rotational positions. The rotational positions may for example be separated by 90 degrees, or by 180 degrees, or by another angle. In so doing, a more accurate positioning of the object 160 with respect to the X-ray detector 110, may be achieved.

In one example, a further image representation of the projected depth camera image data may also be provided. In this example, the processor 140 generates an image representation 170 of the projected depth camera image data from a perspective of the X-ray source 110. This projection may be determined based on the aforementioned predetermined spatial relationship between the X-ray source 110, the X-ray detector 120, and the depth camera 130. This further image representation may also be used to assist an operator to position the object with respect to the X-ray detector.

In one example, X-ray images may also be generated. In this example, the X-ray detector 120 is configured to generate X-ray image data representing the attenuation of X-ray radiation emitted by the X-ray source 110, within the examination region 150, and the processor 140 is further configured to generate an X-ray image representation of the X-ray image data.

In another example, a computer-implemented method is provided for use with the X-ray imaging system 100. The computer-implemented method of generating an image representation 170 using an X-ray imaging system comprising an X-ray source 110, an X-ray detector 120, and a depth camera 130, wherein the X-ray source 110 and the X-ray detector 120 are separated by an examination region 150 for performing an X-ray imaging operation on an object when the object is received within the examination region, and wherein the depth camera 130 is configured to view the examination region 150 for generating depth camera image data representing the object when the object is received within the examination region; includes:
  receiving the depth camera image data;
  projecting the depth camera image data onto a radiation-receiving surface of the X-ray detector 120, from a perspective of the X-ray source 110; and
  generating an image representation 170 of the projected depth camera image data on the radiation-receiving surface of the X-ray detector 120, from a perspective of the depth camera 130.

In another example, a computer program product is provided for use with the X-ray imaging system 100. The computer program product comprises instructions which when executed by one or more processors 140, cause the one or more processors 140 to carry out a method of generating an image representation 170 using an X-ray imaging system comprising an X-ray source 110, an X-ray detector 120, and a depth camera 130, wherein the X-ray source 110 and the X-ray detector 120 are separated by an examination region 150 for performing an X-ray imaging operation on an object when the object is received within the examination region, and wherein the depth camera 130 is configured to view the examination region 150 for generating depth camera image data representing the object when the object is received within the examination region. The method comprises:
- receiving the depth camera image data;
- projecting the depth camera image data onto a radiation-receiving surface of the X-ray detector 120, from a perspective of the X-ray source 110; and
- generating an image representation 170 of the projected depth camera image data on the radiation-receiving surface of the X-ray detector 120, from a perspective of the depth camera 130.

The above examples are to be understood as illustrative of the present disclosure, and not restrictive. Further examples are also contemplated. For instance, the examples described in relation to the X-ray imaging system may also be provided by the computer-implemented method, or by the computer program product, or by the computer-readable storage medium, in a corresponding manner. It is to be understood that a feature described in relation to any one example may be used alone, or in combination with other described features, and may be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. An X-ray imaging system, comprising:
an X-ray source;
an X-ray detector separated from the X-ray source by an examination region for performing an X-ray imaging operation on an object when the object is received within the examination region;
a depth camera configured to view the examination region for generating depth camera image data representing the object when the object is received within the examination region; and
a processor configured to:
receive the depth camera image data;
project the depth camera image data onto a radiation-receiving surface of the X-ray detector from a perspective of the X-ray source; and
generate an image representation of the projected depth camera image data on the radiation-receiving surface of the X-ray detector from a perspective of the depth camera.

2. The X-ray imaging system according to claim 1, wherein the processor is configured to project the depth camera image data onto the radiation-receiving surface of the X-ray detector, from the perspective of the X-ray source, and/or to generate the image representation of the projected depth camera image data on the radiation-receiving surface of the X-ray detector, from the perspective of the depth camera, based on a predetermined spatial relationship between the X-ray source, the X-ray detector, and the depth camera.

3. The X-ray imaging system according to claim 2, wherein the depth camera is further configured to view at least a portion of the radiation-receiving surface of the X-ray detector;
wherein the depth camera is further configured to generate depth camera image data representing the at least a portion of the radiation receiving surface of the X-ray detector;
wherein the processor is further configured to:
determine a spatial relationship between the depth camera and the X-ray detector from the generated depth camera image data representing the at least a portion of the radiation receiving surface of the X-ray detector; and
determine the spatial relationship between the X-ray source, the X-ray detector, and the depth camera, using the determined spatial relationship between the depth camera and the X-ray detector.

4. The X-ray imaging system according to claim 3, wherein the processor is configured to determine the spatial relationship between the X-ray source, the X-ray detector, and the depth camera, based further on calibration data representing the relative positions of the X-ray source and the depth camera and/or the relative positions of the X-ray source and the X-ray detector.

5. The X-ray imaging system according to claim 2, wherein the predetermined spatial relationship between the X-ray source, the X-ray detector, and the depth camera, is determined based on calibration data representing the relative positions of the X-ray source, the X-ray detector, and the depth camera.

6. The X-ray imaging system according to claim 1, wherein the X-ray detector comprises one or more radiation-sensitive regions for generating X-ray image data and/or one or more radiation dose-measurement regions for generating X-ray dose measurement data; and wherein the processor is configured to generate an overlay representation including the one or more X-ray radiation-sensitive regions and/or a representation of the one or more X-ray radiation dose-measurement regions, and the image representation of the projected depth camera image data.

7. The X-ray imaging system according to claim 6, wherein the processor is further configured to compute a displacement between a position of one or more features in the image representation of the projected depth camera image data, and an expected position of the one or more features respective i) the representation of the one or more X-ray radiation-sensitive regions and/or ii) the representation of the one or more X-ray radiation dose-measurement regions; and wherein the processor is further configured to generate, based on the computed displacement, an output representing one or more corrective actions for reducing the displacement.

8. The X-ray imaging system according to claim 1, wherein the depth camera is further configured to generate optical image data; and wherein the processor is configured to generate the image representation of the projected depth camera image data, such that the image representation includes the optical image data.

9. The X-ray imaging system according to claim 1, wherein the depth camera is mechanically coupled to the X-ray source;
wherein the depth camera is offset in a radial direction with respect to an axis passing through the X-ray source and a center of the X-ray detector, or wherein the depth camera is offset in a radial direction with respect to an axis passing through the center of a radiation beam emitted by the X-ray source; and wherein the depth camera is rotatable about the axis for generating the depth camera image data from different rotational positions with respect to the axis.

10. The X-ray imaging system according to claim 1, wherein the processor is further configured to generate an image representation of the projected depth camera image data; from a perspective of the X-ray source.

11. The X-ray imaging system according to claim 1, wherein the X-ray detector is configured to generate X-ray image data representing the attenuation of X-ray radiation emitted by the X-ray source, within the examination region; and wherein the processor is further configured to generate an X-ray image representation of the X-ray image data.

12. The X-ray imaging system according to claim 1, wherein the depth camera image data represents a shape of a surface of the object.

13. The X-ray imaging system according to claim 1, wherein the image representation of the projected depth camera image data comprises an overlay of a portion of a surface of the object, or a portion of a silhouette of the object, or a portion of an outline of the object, on the radiation-receiving surface of the X-ray detector.

14. A computer-implemented method for generating an image representation using an X-ray imaging system, comprising:

providing an X-ray source, an X-ray detector, and a depth camera, wherein the X-ray source and the X-ray detector are separated by an examination region for performing an X-ray imaging operation on an object when the object is received within the examination region, and wherein the depth camera is configured to view the examination region for generating depth camera image data representing the object when the object is received within the examination region;

receiving the depth camera image data;

projecting the depth camera image data onto a radiation-receiving surface of the X-ray detector, from a perspective of the X-ray source; and generating an image representation of the projected depth camera image data on the radiation-receiving surface of the X-ray detector, from a perspective of the depth camera.

15. A non-transitory computer-readable medium for storing executable instructions, which cause a method to be performed for generating an image representation using an X-ray imaging system, the method comprising:

providing an X-ray source, an X-ray detector, and a depth camera, wherein the X-ray source and the X-ray detector are separated by an examination region for performing an X-ray imaging operation on an object when the object is received within the examination region, and wherein the depth camera is configured to view the examination region for generating depth camera image data representing the object when the object is received within the examination region;

receiving the depth camera image data;

projecting the depth camera image data onto a radiation-receiving surface of the X-ray detector from a perspective of the X-ray source; and generating an image representation of the projected depth camera image data on the radiation-receiving surface of the X-ray detector from a perspective of the depth camera.

* * * * *